May 12, 1931.  C. S. RAYMOND  1,805,416
ARTIFICIAL BAIT

Filed Oct. 29, 1929

WITNESS
C. H. Mann

INVENTOR
C. S. Raymond
BY Munn & Co.
ATTORNEY

Patented May 12, 1931

1,805,416

UNITED STATES PATENT OFFICE

CARL S. RAYMOND, OF FLINT, MICHIGAN

ARTIFICIAL BAIT

Application filed October 29, 1929. Serial No. 403,305.

This invention relates to artificial bait used more especially in trolling.

A primary object of the invention is to provide a bait of this character having great attractive qualities and showing a large reflecting surface as it is propelled through the water.

Another object of the invention is to provide a spoon or bait which while primarily intended for trolling may be used for casting and still fishing and which while having all of the attractive qualities of the more expensive structures may be very cheaply manufactured owing to its simplicity and which will fit compactly one within the other so that a number may be packed in a very small space thereby simplifying the fishing outfit, or rather the space required for transporting it.

In carrying out these objects, the invention is susceptible of a wide range of modification without departing from the spirit or sacrificing any of the advantages of the claimed invention; there being shown in the drawings for illustrative purposes a preferred and practical form, in which:

The bait constituting this invention comprises an elongated substantially ovate transversely concavo-convex body 1 made from metal having a polished reflecting surface, preferably of nickel, and which is of a thickness sufficient to present the proper rigidity to resist the strain to which it will be subjected to avoid its becoming bent and injured in use. This body has the edges thereof made serpentine in form with the convexities 2 of one edge arranged opposite the concavities 3 of the other as is shown clearly in Fig. 2 and which are designed to facilitate the zig-zag movement of the bait through the water to add to its alluring features.

Figure 1:
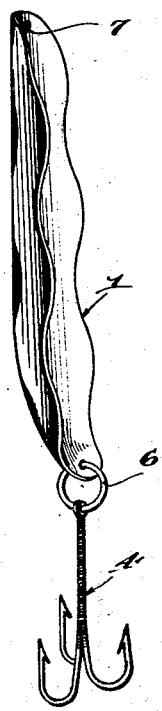
Figure 1 represents a perspective view taken from the inside or side edge of a bait constructed in accordance with this invention.
Figure 2:
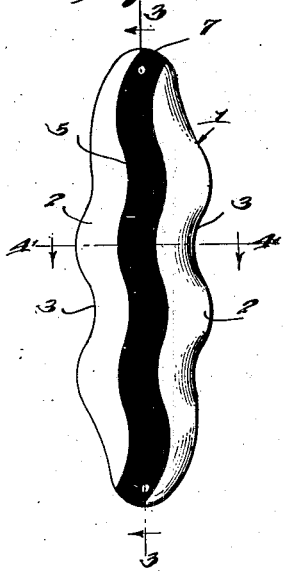
Fig. 2 is a top plan view thereof.
Figure 4:
Fig. 4 is a transverse section taken on the line 4—4 of Fig. 2.
Figure 3:
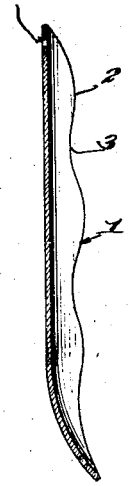
Fig. 3 is a longitudinal section taken on the line 3—3 of Fig. 2.

Extending longitudinally down the back of the bait from end to end is a stripe 5 of any desired bright color and which is preferably made serpentine as shown in Fig. 2. This combination of a brilliantly colored stripe with the highly polished convex surface of the bait will render it very attractive in its passage through the water and cause the fish to spring up and grab it. At one end of this bait 1 is a hook here shown provided with three prongs and which is connected with the bait by a ring 6 loosely mounted in the end of the bait. The other end of the bait has an aperture 7 for connection of the fishing line, which connection may be made by means of a swivel or otherwise.

From the above description it will be seen that this bait is made from a single piece of metal having no projections or seams to interfere with its passage through the water and owing to the highly polished surface of the bait in combination with the red or other highly colored streak down the back it will present the appearance of a bright fish moving rapidly through the water.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. An artificial bait comprising an elongated substantially ovate body having a comparatively straight back and serpentine sides, and a contrasting stripe extending longitudinally of the outer face thereof.

2. An artificial bait comprising an elongated convexo-concave body with the side edges thereof made serpentine and the convexities of one edge arranged in staggered relation to the convexities of the other to facilitate the zig-zag movement of the bait through the water, and zig-zag stripe of contrasting color extending longitudinally thereof.

3. An artificial bait comprising an elongated convexo-concave body with a comparatively straight back and with the side edges thereof made serpentine and the convexities of one edge arranged in staggered relation to the convexities of the other to facilitate the zig-zag movement of the bait through the water.

CARL S. RAYMOND.